United States Patent [19]
Evans

[11] 3,737,118
[45] June 5, 1973

[54] NUTATION DAMPER
[75] Inventor: Jack Evans, Baltimore, Md.
[73] Assignee: The United States of America as represented by the Administrator of the National Aeronautics and Space Administration, Washington, D.C.
[22] Filed: Jan. 18, 1971
[21] Appl. No.: 107,376

[52] U.S. Cl..................................244/1 SA, 188/266
[51] Int. Cl..............................................B64g 1/20
[58] Field of Search....................244/1 SA, 78, 1 SS, 244/77 SS, 3.21; 188/266, 268, 269, 290; 68/23.1, 23.2, 23.3

[56] References Cited
UNITED STATES PATENTS

| | | | |
|---|---|---|---|
| 2,605,628 | 8/1952 | Smith | 68/23.3 |
| 3,266,600 | 8/1966 | Brunner | 188/268 X |
| 3,235,082 | 2/1966 | Compans | 68/23.2 X |
| 3,034,745 | 5/1962 | Stewart | 244/1 SA |
| 3,048,350 | 8/1962 | Cutler | 244/1 SA |
| 3,168,263 | 2/1965 | Kamm | 244/1 SA |

*Primary Examiner*—Richard E. Aegerter
*Assistant Examiner*—Bruce H. Stoner, Jr.
*Attorney*—R. F. Kempf, E. Levy, John R. Manning and Neil B. Siegel

[57] ABSTRACT

A nutation damper for use on a spinning body is disclosed wherein the damper is positioned parallel to the spin axis of the body and radially displaced therefrom. The damper is partially filled with a fluid and contains a porous media to impede the flow of the fluid induced by nutation.

9 Claims, 7 Drawing Figures

PATENTED JUN 5 1973

INVENTOR.
JACK EVANS
BY NEIL B. SIEGEL
ATTORNEYS

INVENTOR,
JACK EVANS
BY NEIL F. SIEGEL
ATTORNEYS

NUTATION DAMPER

STATEMENT OF ORIGIN

The invention described herein was made by an employee of the United States Government and may be manufactured and used by or for the Government for governmental purposes without the payment of any royalties thereon or therefor.

BRIEF DESCRIPTION

This invention relates to dampers and more particularly to devices which damp nutation from spinning bodies. Nutation dampers find general utility, for example, in large electric motor or generator rotors, centrifuges, spinning spacecraft and washing machines to maintain rotation of the body about a constant axis without pertubations.

Nutation is commonly defined as a coning or wobbling of the spin axis of a body. It is known as the condition resulting from the angular deviation of the spin axis angular momentum from the total angular momentum vector. When these axes coincide there is no nutation, but when some deviation occurs, since both axes must pass through the center of mass of the body, a coning effect occurs. This coning is the result of external torques and if uncorrected will ultimately result in an unstabilized body. The sight of a washing machine "walking" across a floor attests to effect of uncontrolled nutation. In the case of spin-stabilized bodies, such as a spacecraft freely spinning in space, nutation must be eliminated in its incipiency lest the spacecraft be rendered unsuitable for use as an ultra stable platform for experiments which require precise scanning such as laser communications or spin-scan cameras.

In the past a wide variety of devices have been employed in an attempt to eliminate nutation. Dampers have been used in combination with springs or dash pots to gain increased effectiveness. Generally, dampers can be classified as either viscous, eddy current and coulomb types. In the viscous type of which this invention lies prior art nutation dampers comprise elongated tubes or containers positioned parallel to the geometric axis of the body at some radial displacement from it and contain a liquid for dissipating energy generated as a result of nutation. Additionally some contain a type of movable body such as a ball immersed in viscous fluid such that the fluid is forced between the walls of the container and the movable body to dissipate energy as the fluid moves.

These devices, however, are relatively ineffective in that the time needed to damp nutations is fairly long. The ideal nutation damper should be capable of having the energy dissipating means resonant with the frequency of nutation. In most applications this condition is not possible so dampers must be effective below a resonant state consistent with the size and weight requirements allowed for them within the system design for the spinning body.

Accordingly, it is an object of the present invention to provide apparatus for damping the nutation of a spinning body.

Another object of the invention is the provision of apparatus to increase the efficiency of a fluid nutation damper.

Still another object of the present invention is to provide apparatus for damping nutations in a spinning vehicle that is simple in form, reliable in operation, inexpensive yet efficient.

In accordance with the present invention there is provided a damper mounted on a spinning body parallel to the spin axis of the body and radially displaced therefrom, the damper being an elongated tube partially filled with fluid. Also, inside the tube, in one embodiment, is a rolled wire screen running the length of the tube to impede the flow of the fluid which is produced by nutation. In a second embodiment of the invention, the tube is compartmented by screening to provide a plurality of chambers for dissipating the fluid energy.

The following specification and the accompanying drawings respectfully describe and illustrate an exemplification of the present invention in which like reference characters are used to designate like parts through the figures of the drawings.

Figure 1:
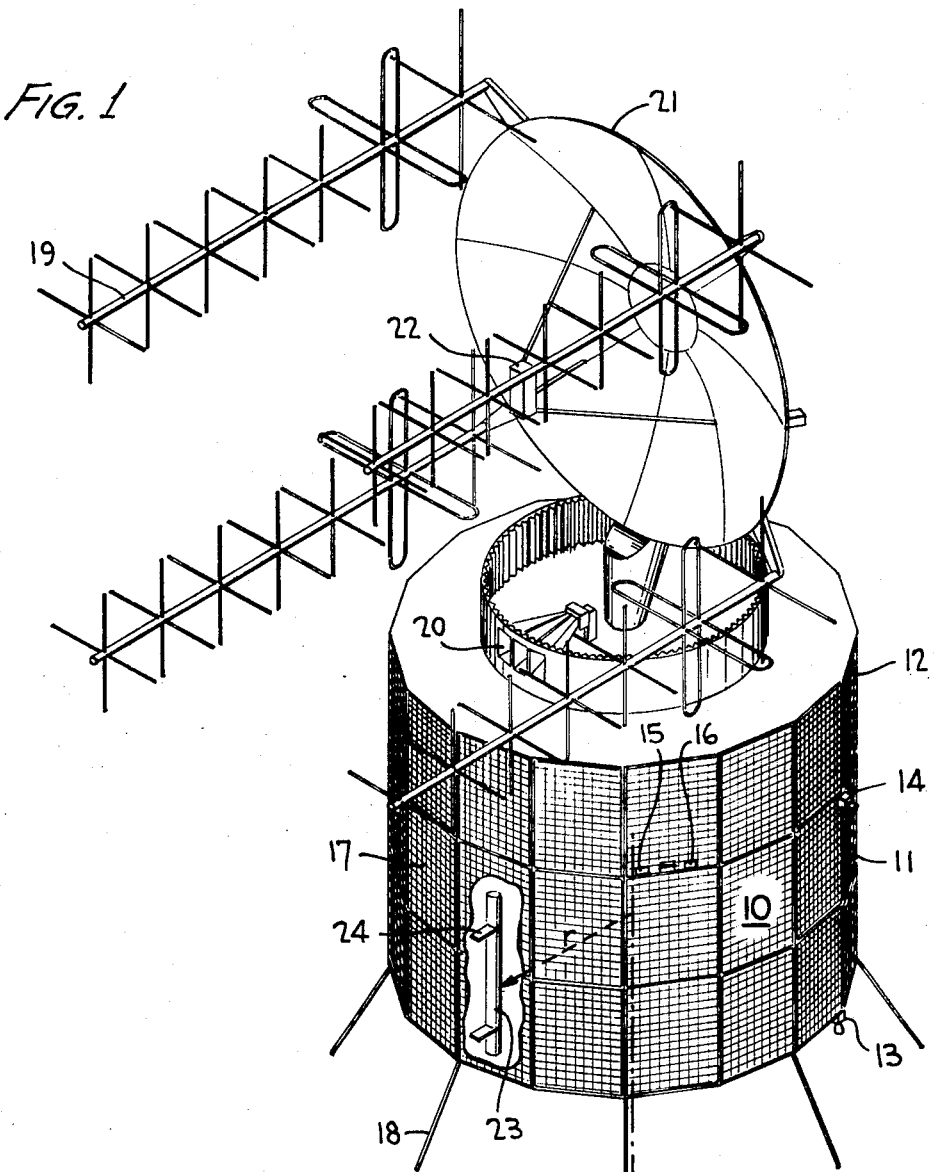
FIG. 1 is a perspective of a space satellite which uses the present invention.

Referring now to FIG. 1 there is shown an exemplary embodiment of a satellite that is typical of one using the present invention. Such a satellite may be of the type used for communications, air traffic control, navigation, earth resources, data relay or a variety of other purposes. The satellite generally indicated by the numeral 10 has a spinning section 11 and a despun section 12. The despun section is rotated in a direction opposite the spinning section and at the same speed to keep the spacecraft antennas pointing at the same location to earth at all times. A system for accomplishing this function is shown in U. S. Pat. No. 3,341,151 to A. Kampinsky.

The spinning section uses axial jets 13 and radial jets 14 to provide proper attitude control for the spacecraft. Earth sensor 15 and sun sensor 16 are provided as inputs to the control system of the spacecraft and the exterior may be covered by solar cells 17 to provide electric power. A plurality of telemetry antennas 18 may also be disposed about the spinning section.

The despun portion 12 may contain a variety of antennas all continuously pointing at the earth. Typically these antennas may comprise VHF antennas 19, X band antenna 20 and S band antenna 21 with a multifeed structure 22. The satellite is spin-stabilized, with the spinning portion rotating about its longitudinal axis, shown here counterclockwise. To eliminate unwanted deviations in the spinning mode, a nutation damper 23 is mounted in the spinning section at a distance and from the axis of rotation and parallel to that axis. The damper, preferably a straight tube, but which may be curved, is mounted to the spacecraft frame by clamps 24.

Figure 2A:
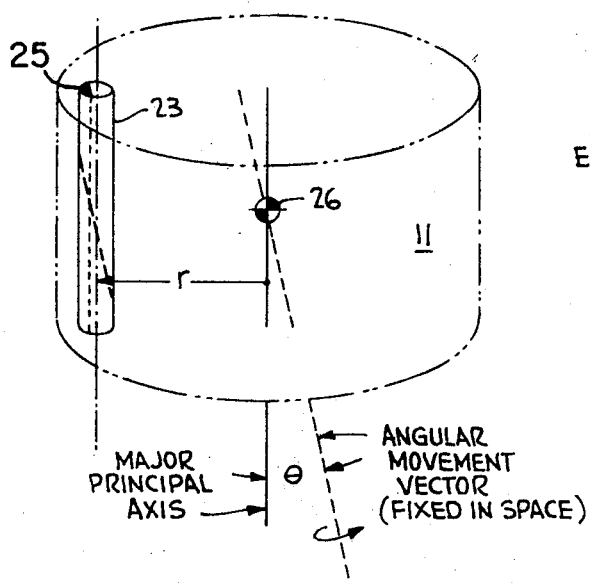
FIG. 2a is a schematic showing the physical relationship between a damper and the angular momentum vector of the body, normally and during a condition of nutation.

As shown in FIG. 2a, the nutation damper contains a quantity of fluid 25 which partially fills the tube. This fluid may be mercury or another non-wetting viscous material. As shown schematicly, the damper 23 is mounted on spinning body 11 parallel to the geometric axis (spin axis) at a distance r. In order to generate the largest centrifugal forces possible on the damper, thereby increasing its efficiency, r should be ideally as close to the outside radius of the spinning body as permissible. Also, to dynamicly balance the spinning body, the center of mass of the damper should lie on the same plane as the center of mass 26 of the body.

Under normal spinning conditions the angular momentum vector and the axis of the principal moment of inertia of the body coincide. However, when a condition of nutation occurs, the axis of the principal moment of inertia is angularly displaced from the angular momentum vector by some angle $\theta$, subtending from the center of mass 26 and rotation occurs about the angular momentum vector. The motion is such that the axis of the principal moment of inertia tends to "cone" about the angular momentum vector.

The fluid in the damper is initially parallel to the angular momentum vector along the tube as a result of centrifugal force, and is displaced in the process of maintaining this alignment when the axis of the principal moment of inertia "cones." As shown in the dotted line a quantity of fluid has been displaced toward the bottom of the tube to maintain this parallelism. As nutation occurs, in 180° the coning will cause the fluid to be displaced toward the upper section of the tube. As a result of this continuous movement of fluid, shear forces, boundary layer effects and viscous friction dissipate the nutation energy and tend to restore the principal inertia axis back to coincidence with the angular momentum vector thereby damping out the nutation.

Figure 2B:
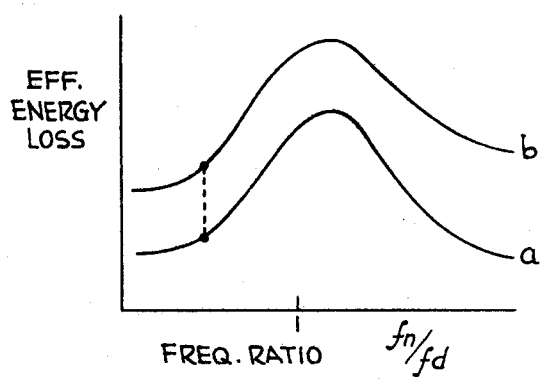
FIG. 2b is a graph showing damper efficiency as a function of the ratio between nutation and damper resonance frequencies.

The efficiency of a damper may be plotted as a function of the ratio of nutation frequency ($fn$) to damper frequency ($fd$), as shown in FIG. 2b. The y-axis is merely an empirical measure of energy loss occasioned by damper use and the x-axis is the frequency ratio of $fn/fd$ where ($fn$) is the frequency of nutation and ($fd$) is the resonant frequency of the damper. Curves $a$ and $b$ represent plots of two dampers, ($a$) for a prior art damper and ($b$) for a damper constructed in accordance with this invention. As clearly shown in FIG. 2b, the maximum efficiency occurs where the nutation frequency equals the damper resonant frequency whereby resulting in a resonant damping effect. This unity ratio is, however, nearly impossible to achieve due to the extreme damper lengths required and, therefore, most dampers operate in the area indicated by dotted lines. The measured efficiency for the damper constructed in accordance with this invention is shown to be considerably higher than the prior art for a given $fn/fd$ ratio.

Figure 3A:
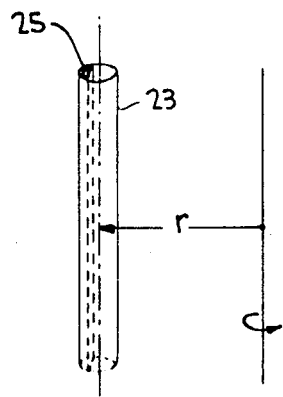
FIGS. 3a and 3b are schematics showing two prior art type dampers.
Figure 3B:
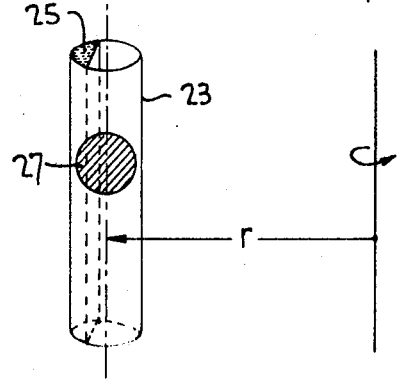

In the prior art, shown in FIG. 3, two general types of dampers for use in spinning bodies are known to exist. FIG. 3a depicts the fluid type of device utilizing an elongated tube 23 and a mass of fluid 25 contained therein. FIG. 3b shows a variation of the fluid type containing a ball 27 or plug inside the tube, in addition to the fluid. This ball acts as a free piston, moving in response to nutation, forcing fluid displacement between it and the tube wall thereby increasing the energy dissipation. Both of these devices are mounted parallel to the geometric axis of the rotating body at a distance r from the axis and as previously pointed out are not nearly efficient as desired. Since nutation is desirably damped out at low levels, the efficiency of these devices only at large pertubations renders them unsuited for many applications.

Figure 4:
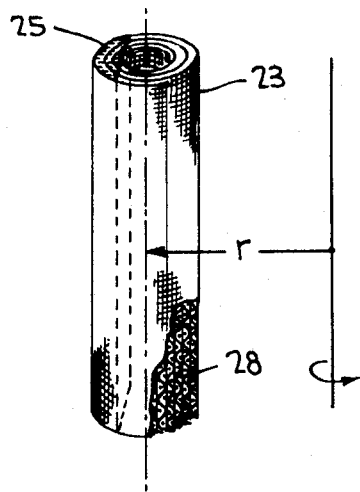
FIG. 4 is a sectional elevation of one preferred embodiment of the present invention showing the use of rolled longitudinal screening in the tube.

FIG. 4 shows one preferred embodiment of the present invention which includes an elongated tube 23, partially filled with a non-wetting fluid 25, such as mercury and a section of porous media 28 substantially filling the tube. The material 28 may be a screening with the pore size determined experimentally by Darcy's Law:

$$(dp/dx) f = K_1 (U_L/P_L)(W_L/A_T)$$

where $(dp/dx) f$ is the measured pressure gradient across the porous media due to frictional force, $K_1$ is the friction factor to be solved for, $U_L$ is the viscosity of the fluid flowing through the porous media, $P_L$ is the liquid density, $W_L$ is the liquid mass flow rate and $A_T$ is the cross sectional area of the flow. The friction factor is determined between two extremes, e.g. where the pores are so small that the pressure gradient is large thereby rendering the damper rigid or wholly unresponsive or where the gradient is small such that the porous media has little effect thereby reducing the damper to prior art efficiency. A more complete description of this design consideration is found in NASA-CR-812, "Vapor Chambers Fin Studies," June, 1967.

Generally, the porous media substantially fills the chamber of tube 23 and lines the inside walls. In response to a condition of nutation, the fluid 25 is forced by nutation through the convolutions of screening 28 to continuously change its level such that the liquid surface remains parallel to the angular momentum vector. Since the porous media continuously acts as an impediment to the flow, and the flow is laminar, viscous shear forces are maximized resulting in greater dissipation of energy by the damper for any level of nutation.

Figure 5:
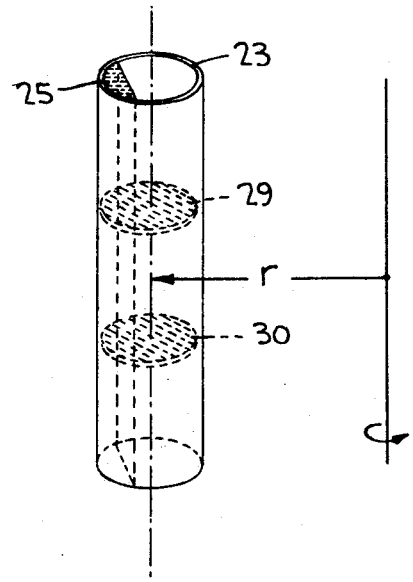
FIG. 5 is a sectional elevation of a second preferred embodiment of the present invention showing the tube sectioned into three chambers, each separated by screening.

A second preferred embodiment is shown in FIG. 5 where, as in the previous embodiment the damper tube 23, partially filled with a viscous fluid 25, is placed on the spinning body parallel to the geometric axis and displaced from it by some distance r. Although not shown in the drawing, the FIG. 5 embodiment may have the inside walls lined with porous media. Within the tube 23 are two cross-sectional mesh plates 29 and 30 which divide the tube into three compartments. If desired, more plates may be used to further compartmentize the tube. In the embodiment shown, damping is effectuated both by longitudinal action along the wall and transverse movement through the plates. In this manner, slight deviations in the axis of rotation due to nutation which cause variations in the orientation of the fluid 25 vis-a-vis the tube 23 and the plates 29, 30 will be acted upon by the interaction of the fluid passing through the porous media.

While these embodiments have been discussed with respect to their use on a spacecraft, it is to be understood that nutation dampers of the type herein described may be used on other spinning bodies. Furthermore, the tube 23, although drawn as a straight circular cylinder, may have a cross section which is in general a single closed contour. In addition, the tube need not be straight. For example, its longitudinal axis may be arcuate. Having described my invention,

I claim:

1. A damper comprising:
   a. elongated containing means comprising a tube having two sealed ends, said containing means being adapted for mounting on a spinning body;
   b. a viscous fluid sealed within said containing means; and
   c. wire screening inside said containing means and disposed to interact with said fluid to dissipate energy.

2. The damper of claim 1 wherein said wire screening is in the form of a series of convolutions extending the length of said containing means.

3. The damper of claim 1 wherein said wire screening is in the form of a series of cross-sectional plates dividing said containing means into a plurality or compartments.

4. The damper of claim 3 wherein said series of cross-sectional plates comprises two plates dividing said containing means into three compartments.

5. Apparatus comprising:
   a. a body having a spin axis passing through the center of gravity thereof and adapted to rotate about said axis;
   b. elongated containing means disposed within said body at a distance from said axis and arranged substantially parallel thereto;
   c. a viscous fluid sealed within said containing means; and
   d. wire screening inside said containing means and disposed to interact with said fluid to dissipate nutations of said body.

6. The apparatus of claim 5 wherein the center of said containing means is on a line normal to said axis of rotation and passes through the center of gravity of said body.

7. The apparatus of claim 5 wherein said wire screening is in the form of a series of convolutions extending the length of said containing means and substantially parallel to the spin axis of the body.

8. The apparatus of claim 6 wherein said wire screening is in the form of a series of plates dividing said containing means into a plurality of compartments, each of said plates disposed within said containing means substantially perpendicular to the spin axis of the body.

9. The apparatus of claim 8 wherein said series of plates comprises two plates dividing said containing means into three compartments.

* * * * *